United States Patent
Favero et al.

(10) Patent No.: US 12,404,446 B2
(45) Date of Patent: Sep. 2, 2025

(54) DISPERSION OF WATER-SOLUBLE POLYMER FOR HYDRAULIC FRACTURING

(71) Applicant: SNF GROUP, Andrezieux-Boutheon (FR)

(72) Inventors: Cédrick Favero, Andrezieux (FR); Bruno Tavernier, Andrezieux (FR); Sebastien Coccolo, Andrezieux (FR); Siham Telilel, Andrezieux (FR)

(73) Assignee: SNF Group, Andrezieux-Boutheon (FR)

( * ) Notice: Subject to any disclaimer, the term of this patent is extended or adjusted under 35 U.S.C. 154(b) by 0 days.

(21) Appl. No.: 18/689,064

(22) PCT Filed: Sep. 13, 2022

(86) PCT No.: PCT/EP2022/075444
§ 371 (c)(1),
(2) Date: Mar. 4, 2024

(87) PCT Pub. No.: WO2023/041539
PCT Pub. Date: Mar. 23, 2023

(65) Prior Publication Data
US 2024/0384159 A1    Nov. 21, 2024

(30) Foreign Application Priority Data
Sep. 15, 2021   (FR) ..................... 2109669

(51) Int. Cl.
*C09K 8/68* (2006.01)
*C09K 8/88* (2006.01)

(52) U.S. Cl.
CPC .............. *C09K 8/68* (2013.01); *C09K 8/88* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 2017/0158948 A1* | 6/2017 | Kim | ............... E21B 43/26 |
| 2019/0345373 A1* | 11/2019 | Favero | ............... C09K 8/80 |
| 2020/0299561 A1* | 9/2020 | Sudur Zalluhoglu | .. C09K 8/035 |

FOREIGN PATENT DOCUMENTS

| | | |
|---|---|---|
| EP | 3448956 B1 | 6/2020 |
| EP | 3770232 A1 | 1/2021 |
| EP | 3601222 B1 | 6/2021 |
| FR | 3094373 A1 | 10/2020 |
| WO | 2021094174 A1 | 5/2021 |

OTHER PUBLICATIONS

FR 2109669, INPI Rapport de Recherche Preliminaire, May 30, 2022, 2 pages.
PCT /EP2022/075444, International Search Report, Dec. 19, 2022, 3 pages.

* cited by examiner

*Primary Examiner* — Andrew Sue-Ako
(74) *Attorney, Agent, or Firm* — Soquel Group LLC

(57) ABSTRACT

An injection fluid for hydraulic fracturing including at least one synthetic water-soluble polymer with a weight average molecular weight greater than or equal to 1 million daltons, the fluid being prepared according to a method including preparing, by radical polymerization an invert emulsion including between 15% and 40% by weight of the polymer, between 20% and 60% by weight of water and at least one hydrocarbon-based solvent, distilling the invert emulsion to obtain a dispersion including between 40% and 60% by weight of particles of the polymer, less than 10% by weight of water and at least one hydrocarbon-based solvent, and diluting the dispersion with 1% to 15% by weight of an aqueous solution including between 20% and 60% by weight of salts.

12 Claims, No Drawings

DISPERSION OF WATER-SOLUBLE POLYMER FOR HYDRAULIC FRACTURING

CROSS-REFERENCE TO RELATED APPLICATIONS

This application claims benefit under 35 USC § 371 of PCT Application No. PCT/EP2022/075444 entitled DISPERSION OF WATER-SOLUBLE POLYMER FOR HYDRAULIC FRACTURING, filed on Sep. 13, 2022 by inventors Cédrick Favero, Bruno Tavernier, Sebastien Coccolo and Siham Telilel. PCT Application No. PCT/EP2022/075444 claims priority of French Patent Application No. 21 09669, filed on Sep. 15, 2021.

FIELD OF THE INVENTION

The invention relates to an injection fluid for hydraulic fracturing comprising at least one synthetic water-soluble polymer, said fluid being a dispersion prepared by the dilution with a brine of a previously distilled invert emulsion of said polymer.

The invention also relates to a hydraulic fracturing method of unconventional underground reservoirs of oil and gas using said injection fluid.

BACKGROUND OF THE INVENTION

The production of petroleum (oil, hydrocarbons) and of gas contained in unconventional underground reservoirs has been undergoing development for several years and requires the opening of fractures in the reservoir for the economic production of oil and gas.

In the remainder of the description of the prior art and of the invention, by «unconventional underground deposits», it is designated deposits requiring special extraction technologies since they do not exist in the form of an accumulation within a porous and permeable rock (see article on source rock hydrocarbons in France: Les hydrocarbures de roche-mère en France Rapport provisoire—CGIET n° 2011-04-G—Ministère de l'écologie, du développement durable, des transports et du logement—Avril 2011). For unconventional gas, mention can be made of shale gas, coal bed methane, or tight gas. For non-conventional oil, mention can be made of heavy oil, shale oil or tight oil.

The deposits contained in unconventional reservoirs are enormous and extremely expansive extending over formerly inoperable areas such as areas containing source rock hydrocarbons e.g. shale gas, tight gas, and coal bed methane. In the United States, shale gas is widely extracted and currently represents 46% of total natural gas produced in the United States, whereas this production only represented 28% in 1998. The very expansive basins are known under the names of Barnett Shale, Ville Fayette Shale, Mowry Shale, Marcellus Shale, Utica Shale . . . . The operation of tight reservoirs has been made possible with increasing advances in drilling techniques.

Production techniques have effectively progressed from vertical wells to horizontal wells, reducing the number of production wells required and the footprint thereof, and allowing best coverage of reservoir volume for maximum recovery of gas or oil. However, permeabilities are insufficient for the hydrocarbon to migrate easily from the source rock towards the well, thereby preventing economic and large-scale production of gas or oil. It is therefore necessary to increase permeability and production surfaces by stimulation operations, and in particular by hydraulic fracturing of the rock in contact with the well.

Hydraulic Fracturing

The purpose of hydraulic fracturing is to create additional permeability and to generate larger production surfaces of gas or oil. Low permeability, natural barriers of tight layers and sealing operations during drilling strongly limit production. The gas or oil contained in the unconventional reservoir cannot easily migrate from the rock towards the well without stimulation.

These hydraulic fracturing operations on horizontal wells were initiated in 1960 in the Appalachians, and at the current time the number of operations that have taken place in the United States amount to several tens of thousands.

Research, reservoir modelling, drilling, cementing, and stimulation technologies have become increasingly more sophisticated with the use of equipment that allows these operations to be carried out in ever shorter times with precise analysis of results.

Reservoir Stimulation by Hydraulic Fracturing

These operations entail injecting water under high pressure and at very strong flow rate for the purpose of obtaining fractures that are distributed perpendicular to the production wells. They are generally carried out in several steps to create fractures over the entire length of the horizontal well, thereby allowing coverage of a maximum volume of the reservoir.

To maintain these fractures open, a propping agent is added (e.g. sand, plastic materials, or calibrated ceramics) to prevent closing of these fractures and to maintain capillarity once injection has been discontinued.

Water alone is insufficient to obtain efficient placing in position of the propping agent, on account of the low viscosity thereof. This limits the ability of water to hold the propping agent in place in the fractures. To counter this problem, fracturing fluids have been developed containing viscosifying compounds.

By definition, it will be said that a compound is viscosifying if it increases the viscosity of the solutions in which it is dissolved.

In addition to having viscosifying properties, the compound must have a particular rheological profile. The compound must effectively be able to generate low viscosity so as not to hamper the transport and pumping of the fluid containing the propping agent when undergoing the strong shear forces created at the time of injecting the fracturing fluid. Once injected, this same compound must be able to generate sufficient viscosity, when shear decreases, to support the propping agent so that it remains in place within the fractures.

Fracturing fluids generally comprise a polymer which must therefore impart shear thinning properties to the solution to obtain relatively low viscosity at the time of injection (at high shear), and high viscosity so that it can maintain the propping agent in suspension at the fracture when shear decreases.

The viscoelastic properties of the polymers in solution are also to be taken into consideration. This viscoelasticity and the importance thereof in the application is described in the document SPE 147206 (*Fracturing Fluid Comprised of Components Sourced Solely from the Food Industry Provides Superior Proppant Transport*—David Loveless, Jeremy Holtsclaw, Rajesh Saini, Phil Harris, and Jeff Fleming, SPE, Halliburton) via visual observations in static or dynamic experiments, or via rheology measurements such as measurement of viscous and elastic modules (G' and G"), or rheometer measurements of viscosity as a function of shear. For example, elastic properties will be advantageous to ensure the transporting and propping of the fracture.

The choice of polymer is therefore not obvious and requires in-depth rheological research to obtain satisfactory results.

Among the viscosifying compounds of aqueous solutions in the prior art, mention can be made of natural substances such as guar gums and derivatives thereof e.g. hydroxypropylguar (HPG), or carboxymethylhydroxypropyl guar (CMHPG); cellulose derivatives such as carboxymethyl cellulose or hydroxyethyl cellulose. These compounds are particularly described in U.S. Pat. Nos. 4,033,415, 3,888, 312 and 4,801,389. In document SPE 152596 (*Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells*—George E. King, Apache Corporation), the latest advances in the performance of fracturing fluids are discussed in detail.

However, these natural substances and in particular derivatives of guar are also useful in other applications such as the food or textile industry, and the booming extraction of unconventional oil and gas resources competes with these other applications. This gives rise to strain on the availability of these products and generates price-related problems.

Other compounds derived from the petrochemical industry can have viscosifying properties. Synthetic polymers can be cited. Poly(meth)acrylamides optionally partially hydrolyzed, and poly(meth)acrylates and the copolymers thereof are particularly known. These polymers develop viscosity by means of their molar mass and through interchain ionic repulsions. These polymers are described in patents GB951147, U.S. Pat. Nos. 3,727,689, 3,841,402 or 3,938, 594. The mechanism governing viscosity is related to an increase in hydrodynamic volume further to intrachain repulsions, interchain interleaving, etc.

However, in the presence of strong salinity or high temperature of use, these polymers do not develop strong interleaving and repulsions, translating as a strong decrease in their viscosifying property especially after undergoing the shear of the pumping step. In addition, these polymers generally do not have sufficient viscoelastic properties to hold the propping agent within the fracture. The dosage of these polymers must be increased to levels that are too high to obtain the suspending properties of the propping agent. The necessary dosage levels are not economically viable however.

The polymers used to obtain viscosifying properties can also advantageously be friction reducers, allowing a reduction in pressure drop in a turbulent medium and a strong increase in flow rate, at equivalent power and pipe diameter.

Synthetic polymers based on 2-acrylamido-2-methylpropane sulfonic acid and/or the salts thereof exhibit friction reducing properties of interest in an aqueous solution. These polymers are also known for their resistance to shear and thermal degradation, in particular in saline solutions. However, obtaining a polymer of very high molecular weight based on 2-acrylamido-2-methylpropane sulfonic acid is difficult, not to mention that these polymers display solubility problems when their molecular weight is increased. Yet, to achieve a phenomenon of optimum friction reduction, and strong generation of viscosity, it is essential that the polymer should be rapidly dissolved in particular in a saline solution, and that it should have a very high molecular weight.

For reasons of logistics, transport, and supply of synthetic water-soluble polymer for hydraulic fracturing, the preferred physical form of these polymers is a powder since this provides a higher weight percentage of active substance. The powder physical form of these polymers can be obtained by drying, thermal drying, spray drying and drum drying. However, the replacing in solution thereof requires adapted equipment, for example a wet medium milling unit for powders such as a Polymer Slicing Unit (PSU).

Invert emulsions of polymers are also of interest, but they require strictly optimized formulation so that inversion thereof in an aqueous medium is most rapid and the stability thereof (during storage and transport) is guaranteed (in particular during freeze/thaw cycles).

DETAILED DESCRIPTION

The Applicant has found and developed an injection fluid for hydraulic fracturing which allows the obtaining of high friction reducing and viscosifying effects. This injection fluid is in the form of a water-soluble polymer dispersion, and it is prepared by diluting a previously distilled invert polymer emulsion with a brine.

Surprisingly, the prior dilution of the distilled polymer emulsion (polymer dispersion) with a brine allows a signification increase in the capability thereof to undergo inversion in the saline injection waters (when injecting into the underground formation), which implies efficient placing in solution of the polymer (rapid and almost complete) to maximize the effect on application.

The carbon footprint of this fluid is reduced since it is in concentrated polymer form which denotes lower transport costs in addition to the fact that no specific dissolution equipment is required for use thereof.

A first aspect of the invention therefore concerns an injection fluid F for hydraulic fracturing comprising at least one synthetic water-soluble polymer P having a weight average molecular weight greater than or equal to 1 million daltons, said fluid being prepared with a method comprising the following successive steps:

a) Preparing, by radical polymerization, an invert emulsion E comprising between 15% and 40% by weight of polymer P, between 20 and 60% by weight of water and at least one hydrocarbon-based solvent, the percentages being expressed by weight relative to the weight of the emulsion E;

b) Distilling the invert emulsion E to obtain a dispersion D comprising between 40 and 60% by weight of particles of polymer P, less than 10% by weight of water and at least one hydrocarbon-based solvent, the percentages being expressed by weight relative to the weight of the dispersion D;

c) Diluting the dispersion D with 1% to 15% by weight of an aqueous solution S comprising between 20 and 60% by weight of salts, the percentages being expressed by weight relative to the total weight of the dispersion D.

A second aspect of the invention concerns a hydraulic fracturing method of an unconventional underground reservoir of oil or gas, using the injection fluid F of the invention.

A third aspect of the invention concerns a friction reducing method using an injection fluid F for a hydraulic fracturing operation of an unconventional underground reservoir of oil or gas, using the injection fluid F of the invention.

Such as used herein, the term "water-soluble polymer" designates a polymer which yields an aqueous solution without any insoluble particle when dissolved under agitation for 4 hours at 25° C. and at a concentration of 20 g·L$^{-1}$ in water.

In the present invention, the "weight average molecular weight" of the synthetic water-soluble polymer P is determined by measuring intrinsic viscosity. Intrinsic viscosity can be measured with methods known to skilled persons, and in particular can be calculated from values of reduced viscosity for different concentrations using a graphical method whereby values of reduced viscosity are plotted (along the Y-axis) as a function of concentrations (on the X-axis) and by extrapolating the curve to zero concentration. The value of intrinsic viscosity is read on the Y-axis, or using the least squares method. The weight average molecular weight can then be determined with the well-known Mark-Houwink equation:

$$[\eta] = K M^\alpha$$

[η] is the intrinsic viscosity of the polymer determined by the method measuring viscosity in solution,
K is an empirical constant,
M is the molecular weight of the polymer,
α is the Mark-Houwink coefficient,
α and K are dependent on the particular polymer-solvent system. Tables known to skilled persons give the values of a and K according to the polymer-solvent system.

The synthetic water-soluble polymer P of the invention has a weight average molecular weight advantageously greater than or equal to 1 million daltons, more advantageously greater than or equal to 1.5 million daltons, and further advantageously greater than or equal to 2 million daltons. It is advantageously lower than or equal to 20 million daltons. Preferably, the synthetic water-soluble polymer P of the invention has a weight average molecular weight of between 1 million daltons and 20 million daltons, more advantageously between 1.5 million daltons and 20 million daltons, and further advantageously between 2 million daltons and 20 million daltons.

The invert emulsion E comprising the synthetic water-soluble polymer P obtained by radical polymerization at step a) of the method for obtaining the fluid F, contains:
a hydrophilic phase comprising at least one water-soluble structured polymer;
a lipophilic phase;
at least one emulsifying agent.

The lipophilic phase can be a mineral oil, a vegetable oil, a synthetic oil, or a mixture of several of these oils. Examples of mineral oil are mineral oils comprising saturated hydrocarbons of aliphatic, naphthenic, paraffinic, isoparaffinic, cycloparaffinic or naphthyl type. Examples of synthetic oil are hydrogenated polydecene or hydrogenated polyisobutene, esters such as octyl stearate or butyl oleate. The range of Exxsol® products by Exxon are perfectly suitable.

In general, the weight ratio of the hydrophilic phase to the lipophilic phase in the invert emulsion is preferably from 50:50 to 90:10.

In the present invention, the term "emulsifying agent" designates an agent capable of emulsifying water in an oil, and an "inverting agent" is an agent capable of emulsifying an oil in water. In general, it is considered that an inverting agent is a surfactant having a HLB value higher than or equal to 10, and an emulsifying agent is a surfactant having a HLB value strictly lower than 10.

The hydrophilic-lipophilic balance (HLB) of a chemical compound is a measurement of the degree to which it is hydrophilic or lipophilic, determined by calculating values of the different regions of the molecule, as described by Griffin in 1949 (Griffin W C, Classification of Surface-Active Agents by HLB, Journal of the Society of Cosmetic Chemists, 1949, 1, pages 311-326).

In the present invention, we have adopted the Griffin method based on calculation of a value based on the chemical groups of the molecule. Griffin allocated a dimensionless number of between 0 and 20 to give information on solubility in water and in oil. Substances having a HLB value of 10 are distributed between the two phases, so that the hydrophilic group (molecular mass Mh) is fully drawn by water, whilst the hydrophobic hydrocarbon group (molecular mass Mp) is adsorbed in the non-aqueous phase.

The HLB value of a substance of total molecular mass M in which the hydrophilic portion has a molecular mass Mh, is: HLB=20 (Mh/M)

The invert emulsion E of the invention is prepared by radical polymerization. An aqueous solution comprising the monomer(s) allowing the polymer P to be obtained is emulsified in an oil phase comprising the emulsifying agent(s). Polymerization is then conducted by adding a free radical initiator. As initiator, reference can be made to redox pairs, cumene hydroperoxide, tert-butyl hydroperoxide, or persulfates among oxidizing agents, and sodium sulfite, sodium metabisulfite and Mohr's salt among reducing agents. Azo compounds such as 2,2'-azobis (isobutyronitrile) hydrochloride and 2,2'-azobis (2-amidinopropane) can also be used.

Conventionally, polymerization is generally conducted isothermally, adiabatically or under controlled temperature. That is to say that the temperature is held constant generally between 10 and 60° C. (isothermal), or else the temperature is left to rise naturally (adiabatic) and in this case the reaction is generally started at a temperature lower than 10° C. and the end temperature is generally higher than 50° C. or, finally, the increase in temperature is controlled to obtain a temperature curve between the isothermal curve and the adiabatic curve (controlled temperature).

Polymerization can be conducted under a pressure lower than atmospheric pressure, optionally under conditions allowing evaporation of some of the water and hydrocarbon solvent from the reaction medium, and preconcentration of the emulsion.

The synthetic water-soluble polymer P is preferably derived from polymerization of monounsaturated ethylene monomers which can be non-ionic and/or anionic and/or cationic and/or zwitterionic. These monomers are preferably the following:
non-ionic monomers chosen from the group comprising acrylamide, methacrylamide, N-alkylacrylamides, N-alkylmethacrylamides, N,N-dialkyl acrylamides, N,N-dialkylmethacrylamides, alkoxylated esters of acrylic acid, alkoxylated esters of methacrylic acid, N-vinylpyridine, N-vinylpyrrolidone, hydroxyalkyl acrylates, hydroxyalkyl methacrylates,
anionic monomers chosen from the group comprising monomers having a carboxylic function and the salts thereof including acrylic acid, methacrylic acid, itaconic acid, maleic acid; monomers having a sulfonic acid function and the salts thereof including acrylamide tertiary butyl sulfonic acid (ATBS), allyl sulfonic acid and methallyl sulfonic acid and the salts thereof; monomers having a phosphonic acid function and the salts thereof.

cationic monomers chosen from the group comprising dimethylaminoethyl acrylate (DMAEA) quaternized or salified; dimethylaminoethyl methacrylate (DMAEMA) quaternized or salified; diallyldimethylammonium chloride (DADMAC); acrylamidopropyltrimethylammonium chloride (APTAC); methacrylamidopropyltrimethylammonium chloride (MAPTAC), zwitterionic monomers chosen from the group comprising sulfobetaine monomers such as sulfopropyl dimethylammonium ethyl methacrylate, sulfopropyl dimethylammonium propylmethacrylamide, sulfopropyl 2-vinylpyridinium; phosphobetaine monomers such as phosphatoethyl trimethylammonium ethyl methacrylate; carboxybetaine monomers.

Optionally, the water-soluble polymer P may comprise at least one LCST or UCST group. According to the general knowledge of persons skilled in the art, a group displaying LCST behaviour corresponds to a group having solubility in water for a determined concentration that is modified over and above a certain temperature and as a function of salinity. It is a group having a transition temperature upon heating which defines its lack of affinity with the solvent medium. The lack of affinity with the solvent translates as opacification or loss of transparency which can be due to precipitation, aggregation, gelling or viscosifying of the medium. The minimum transition temperature is called «LCST» (Lower Critical Solution Temperature). For each concentration of a group displaying LCST, a transition temperature upon heating is observed. It is higher than the LCST which is the lowest point of the curve. Below this temperature, the (co) polymer is soluble in water, above this temperature the (co) polymer loses its solubility in water.

According to the general knowledge of the skilled person, a group displaying UCST behaviour corresponds to a group having solubility in water for a determined concentration that is modified below a certain temperature and as a function of salinity. It is a group having a transition temperature upon cooling which defines its lack of affinity with the solvent medium. The lack of affinity with the solvent translates as opacification or loss of transparency which can be due to precipitation, aggregation, gelling or viscosifying of the medium. The maximum transition temperature is called «UCST» (Upper Critical Solution Temperature). For each concentration of a group displaying UCST, a transition temperature upon cooling is observed. It is higher than the LCST which is the lowest point on the curve. Over and above this temperature, the (co) polymer is soluble in water, below this temperature the (co) polymer loses its solubility in water.

The water-soluble polymer P in the invert emulsion E can be linear or structured by at least one structuring agent able to be chosen from the group comprising monomers with polyethylene unsaturation (having at least two unsaturated functions) such as vinyl, allyl, acrylic and epoxy functions, and as examples there can be mentioned methylene bis acrylamide (MBA), diallylamine, triallylamine, tetraallylammonium chloride, polyethylene glycol dimethacrylate, or macroinitiators such as polyperoxides, polyazo compounds and chain transfer agents such as polymercaptan polymers or hydroxyalkylacrylates, epoxyvinyl compounds.

The water-soluble polymer P can also be structured to an invert emulsion using controlled radical polymerization techniques (CRP) or, and more particularly, of RAFT type (Reversible Addition Fragmentation Chain Transfer).

According to another preference, the invert emulsion E of water-soluble polymer P may comprise:
a hydrophilic phase comprising at least one water-soluble (co) polymer P,
a lipophilic phase,
at least one interfacial polymer composed of at least one monomer of formula (I):

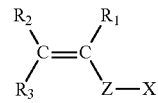

[Chem 1]

Formula (I) where:
$R^1$, $R^2$, $R^3$ are independently chosen from the group composed of a hydrogen atom, a methyl group, a carboxylate group, and Z—X,
Z is chosen from the group composed of C(=O)—O; C(=O)—NH; O—C(=O); NH—C(=O)—NH; NH—C(=O)—O; and a carbon chain having 1 to 20 carbon atoms, saturated or unsaturated, substituted or unsubstituted, possibly comprising one or more heteroatoms preferably 1, 2 or 3 heteroatoms chosen from among nitrogen and oxygen;
X is a group chosen from among alkanolamides, sorbitan esters, ethoxylated sorbitan esters, glyceryl esters, and polyglycosides; X comprising a hydrocarbon chain preferably having 6 to 24 carbon atoms, saturated or unsaturated, linear, branched or cyclic, optionally aromatic.

Without wishing to be bound by any theory, the interfacial polymer obtained by polymerizing at least one monomer of formula (I) forms a shell at the interface of the hydrophilic phase and lipophilic phase.

In general, the hydrophilic phase is in the form of dispersed micrometric droplets, advantageously emulsified, in the lipophilic phase. The mean size of these droplets is advantageously between 0.01 and 30 µm, more advantageously between 0.05 and 3 µm. The interfacial polymer therefore comes to position itself at the interface between the hydrophilic phase and the lipophilic phase at each droplet. The interfacial polymer fully or partially encapsulates each of the droplets. The mean size of the droplets is advantageously measured with laser measuring apparatus using conventional techniques lying within the general knowledge of skilled persons. Equipment of Mastersizer type by Malvern could be used for this purpose.

Advantageously, the interfacial polymer comprises between 0.0001 and 10%, more advantageously between 0.0001 and 5%, further advantageously from 0.0001 to 1%, in number of monomers of formula (I), compared with the total number of monomers.

The interfacial polymer forms a shell around the droplets forming the hydrophilic phase. In addition to the above-mentioned monomers, the interfacial polymer may comprise at least one structuring agent. The structuring agent is advantageously chosen from among diamine diacrylamides or methacrylamides; the acrylic esters of di, tri, or tetrahydroxy compounds; the methacrylic esters of di, tri, or tetrahydroxy compounds; divinyl compounds preferably separated by an azo group; diallyl compounds preferably separated by an azo group; the vinyl esters of di- or trifunctional acids; the allyl esters of di- or trifunctional acids; methylenebisacrylamide; diallylamine; triallylamine;

tetraallylammonium chloride; divinylsulfone; polyethylene glycol dimethacrylate and the diallyl ether of diethyleneglycol.

Preferably, the invert emulsion E comprises from 0.5% to 5.0% by weight, the percentages being expressed by weight relative to the weight of the emulsion E, of at least one emulsifying agent preferably chosen from among sorbitan esters, polyethoxylated sorbitan esters, polyethoxylated fatty acids, polyethoxylated fatty alcohols, polyesters having an average molecular weight of between 1000 and 3000 daltons resulting from condensation between a poly(isobutenyl) succinic acid or anhydride thereof and a polyethylene glycol, block copolymers having an average molecular weight of between 2500 and 3500 daltons resulting from condensation between hydroxystearic acid and a polyethylene glycol, ethoxylated fatty amines, derivatives of di-alkanol amides, copolymers of stearyl methacrylate, and mixtures of these emulsifying agents.

This emulsifying agent is added to the lipophilic phase prior to the radical polymerization reaction.

Optionally, a natural or synthetic polymer (described in particular in U.S. Pat. No. 10,647,908) can be added on completion of the radical polymerization reaction at step a) of the method for obtaining the fluid F. Among natural polymers, examples are guar gums and derivatives thereof such as hydroxypropylguar (HPG), or carboxymethylhydroxypropyl guar (CMHPG); cellulose derivatives such as carboxymethyl cellulose, hydroxyethyl cellulose or hydroxypropylcelulose. Advantageously, the polymer P is in majority content compared with the natural polymer, preferably polymer P represents from 50 to 100% by weight, more preferably 70 to 100%, further preferably from 90 to 100%, relative to the total weight of polymer P+natural polymer.

Step b) of the method for obtaining the injection fluid F entails distilling the invert emulsion E to obtain a dispersion D; after distillation, polymer P therefore being in the form of particles (solids) comprising between 40 and 60% by weight of particles of polymer P, less than 10% by weight of water and at least one hydrocarbon-based solvent, the percentages being expressed by weight relative to the weight of the dispersion D. Distillation is performed under reduced pressure, preferably at a pressure of between 20 and 250 mbar and at a temperature of between 10 and 110° C.

Preferably, in the injection fluid of the invention, polymer P is in the form of particles (solids).

Preferably, the particles of synthetic water-soluble polymer P in the dispersion D have a mean size of between 0.01 µm and 100 µm, more preferably between 0.1 µm and 5 µm. By mean size in the present invention, it is meant the mean diameter of the particles. Analysis of particle size is carried out using conventional techniques known to the skilled person. An example of equipment for measuring the mean diameter of particles is the Mastersizer by Malvern Instruments.

After completing distillation and therefore before step c) of the method for obtaining the injection fluid F of the invention, preferably the addition is made to the dispersion (D) of between 0.2 and 10% by weight, the percentages being expressed by weight relative to the weight of the dispersion D, of at least one inverting agent, The inverting agent is preferably chosen from among ethoxylated nonylphenols preferably having 4 to 10 ethoxylations; ethoxylated/propoxylated alcohols preferably comprising an ethoxylation/propoxylation having between 12 and 25 carbon atoms; ethoxylated tridecyl alcohols; polyethoxylated fatty acids, poly (ethoxylated/propoxylated) fatty alcohols; ethoxylated sorbitan esters; polyethoxylated sorbitan laurate; polyethoxylated castor oil; heptaoxyethylated lauryl alcohol; polyethoxylated sorbitan monostearate; alkylphenol polyethoxylated cetyl ethers; polyoxyethylene alkyl aryl ethers; N-cetyl-N-ethyl morpholinium ethosulfate; sodium lauryl sulfate; condensation products of fatty alcohols with ethylene oxide; condensation products of alkylphenols and ethylene oxide; condensation products of fatty amines with 5 or more molar equivalents of ethylene oxide; ethoxylated tristyryl phenols; condensates of ethylene oxide with partially esterified polyhydric alcohols having fatty chains and the anhydrous forms thereof; amine oxides; alkyl polyglucosides; glucamide; phosphate esters; alkylbenzene sulfonic acids and the salts thereof; water-soluble surfactant polymers; and mixtures of several of these inverting agents.

Step c) of the method for obtaining the injection fluid F entails diluting the dispersion D with 1% to 15% by weight of an aqueous solution S containing between 20 and 60% of salts, preferably between 25 and 45%, the percentages being expressed by weight relative to the weight of the dispersion D. The solution S is preferably a brine solution.

Preferably, at least one portion of the water of solution S is taken from the distillate of the emulsion E.

Advantageously, the salts of the aqueous solution S are alkali or alkaline-earth salts, or ammonium salts, or organic salts, or a mixture of these salts. More preferably, the salts are chosen from among sodium chloride, ammonium sulfate ammonium thiosulfate, ammonium chloride, choline chloride, monosaccharide salts, or a mixture of these salts.

After step c) of the method for obtaining the fluid F, other compounds known to skilled persons can be added such as those cited in document SPE 152596, for example:

- Biocides to prevent the development of bacteria in particular sulfate-reducing bacteria able to form viscous masses reducing flow surface areas. For example, mention can be made of glutaraldehyde which is the most frequently used, or formaldehyde or isothiazolinones; and/or
- Oxygen reducers such as ammonium bisulfite to prevent the destruction of other components via oxidation and corrosion of injection pipes; and/or
- Anticorrosion additives to protect pipes against oxidation through residual quantities of oxygen, such as N, N-dimethylformamide; and/or
- Lubricants such as oil distillates; and/or
- Chelating agents for iron, such as citric acid, EDTA (ethylene diamine tetra-acetic acid), phosphonates; and/or
- Descaling products such as phosphates, phosphonates, polyacrylates or ethylene glycol.

The present invention therefore also concerns a method for preparing an injection fluid F comprising the following steps:

a) Preparing, by radical polymerization, an invert emulsion E comprising between 15% and 40% by weight of a synthetic water-soluble polymer P having a weight average molecular weight greater than or equal to 1 million daltons, between 20 and 60% by weight of water and at least one hydrocarbon-based solvent, the percentages being expressed by weight relative to the weight of the emulsion E;

b) Distilling the invert emulsion E to obtain a dispersion D comprising between 40 and 60% by weight of particles of polymer P, less than 10% by weight of water and at least one hydrocarbon-based solvent, the percentages being expressed by weight relative to the weight of the dispersion D, c) Diluting the dispersion D with 1% to 15% by weight of an aqueous solution S comprising between 20 and 60% by weight of salts, the percentages being expressed by weight relative to the weight of the dispersion D.

The steps of the method are such as described above.

A second aspect of the invention also concerns a method for the hydraulic fracturing of an unconventional underground reservoir of oil or gas, comprising the preparation of an injection fluid F such as previously described, the placing in solution in salt water and injecting of said fracturing fluid F into an underground formation.

Injection is carried out under pressure to create fractures distributed along the length of the production well.

Prior to injection thereof into the underground formation, the injection fluid F obtained with the method of the invention is placed in solution in salt water to obtain a polymer concentration of between 0.01 and 10 g/L in this salt water.

The salt waters are seawaters, or they can advantageously be prepared with monovalent and/or polyvalent salts or combinations thereof.

Examples of salts include, without being limited thereto, sodium, lithium, potassium, aluminium, ammonium, phosphate, sulfate, magnesium, barium, nitrate salts, and other inorganic salts and mixtures thereof.

The salt waters preferably contain at least one of the following elements: sodium chloride, calcium chloride, sodium bromide, calcium bromide, barium chloride, magnesium chloride, zinc bromide, sodium formate and potassium formate.

Preferably, the salt water used for placing the injection fluid F in solution contains more than 70 000 ppm of salts, and more preferably more than 100 000 ppm of salts, preferably the brine contains from 70 000 to 350 000 ppm of salts, further preferably from 100 000 to 350 000 ppm.

Preferably the divalent ratio R+=mass ratio: divalent salts/total salts in the salt water is higher than or equal to 0.20 and more preferably R+≥0.25.

Preferably, for injection of the injection fluid F into the underground formation, at least one propping agent is added before or after the fluid is placed in solution in the salt water.

The propping agent can be chosen from among, but not limited thereto, sand, ceramic, bauxite, glass beads and resin-impregnated sand. It advantageously represents from 0.5 to 40%, more preferably from 1 to 25% and further preferably from 1.5 to 20% by weight relative to the total weight of the injection fluid F for hydraulic fracturing.

Optionally, before, during or after the creation of fractures, at least one oxidizing compound and/or at least one surfactant compound is injected into the reservoir.

The injection of surfactant allows wettability with the rock to be removed, whilst injection of the oxidizing compound destroys the copolymer. In both cases, this injection allows restoring of fluid viscosity close to that of water.

As oxidizing compound, mention can be made of bleach (aqueous solution of a hypochlorite salt), hydrogen peroxide, ozone, chloramines, persulfates, permanganates or perchlorates.

The chemical nature of the surfactant compound(s) is not critical. They can be anionic, non-ionic, amphoteric, zwitterionic and/or cationic. Preferably, the surfactant compound(s) of the invention carry anionic charges.

Preferably, the surfactant compounds used are chosen from among anionic surfactants and the zwitterions thereof chosen from the group comprising derivatives of alkylsulfates, alkylethersulfates, arylalkylsulfates, arylalkylethersulfates, alkylsulfonates, alkylethersulfonates, arylalkylsulfonates, arylalkylethersulfonates, alkylphosphates, alkyletherphosphates, arylalkylphosphates, arylalkyletherphosphates, alkylphosphonates, alkyletherphosphonates, arylalkylphosphonates, arylalkyletherphosphonates, alkylcarboxylates, alkylethercarboxylates, arylalkylcarboxylates, arylalkylethercarboxylates, alkyl polyethers, arylalkyl polyethers.

By alkyl chain it is defined a chain of 6 to 24 carbon atoms, branched or unbranched, with or without several repeat units, optionally possibly comprising one or more heteroatoms, for example O, N or S, preferably 1, 2 or 3 heteroatoms. By arylalkyl chain it is defined a chain of 6 to 24 carbon atoms, branched or unbranched, comprising one or more aromatic rings and optionally possibly comprising one or more heteroatoms, for example 1, 2 or 3 heteroatoms, preferably O, N or S.

The surfactant agent(s) the most routinely used, for reasons of cost, stability and availability, are of sulfonate or sulfate type, in the form of alkali metal or ammonium salts.

Finally, a last aspect of the invention concerns a friction reducing method for hydraulic fracturing operations of an unconventional underground reservoir of oil or gas, comprising the preparation of a fluid F such as previously described, the placing in solution in salt water and the injecting of said fracturing fluid into an underground formation.

A reduction in friction allows the reducing or elimination of friction-related losses when injecting the fracturing fluid.

EXAMPLES OF EMBODIMENT OF THE INVENTION

The following examples illustrate the invention without however limiting the scope thereof. The proportions of the different compounds are given as a weight percentage relative to the final weight of the emulsions.

Example 1—Preparation of an Invert Emulsion E1 of Polymer P1

An aqueous phase was prepared with 42.1 g of acrylamide solution (50% by weight in water), 9.1 g of acrylic acid, 10.1 g of sodium hydroxide solution (50% by weight in water), 0.49 g of diethylenetriaminepentaacetic acid solution (40% by weight in water), 0.02 g of tert-butyl hydroperoxide solution (70% by weight in water), 0.006 g of sodium hypophosphite and 9.134 g of water.

An organic phase was prepared by mixing 20.1 g of oil (Exxsol® D120 S) with 2.3 g of sorbitan monooleate, 0.5 g of 5 times ethoxylated sorbitan monooleate and 5 g of surfactant polymer.

The aqueous phase was added to the organic phase under shear to form an emulsion. The emulsion was degassed with a stream of nitrogen for 30 minutes while holding the temperature at 20° C. After this time, 0.75 g of sodium metabisulfite in solution (at 0.01% by weight in water) was injected for 90 minutes. The polymerization temperature was held at between 40 and 55° C. The residual monomers were caused to react by adding 0.4 g of sodium bisulfite solution (at 40% mass concentration).

An invert emulsion E1 containing 33% by weight of a copolymer P1 of acrylamide and sodium acrylate was obtained.

Example 2—Preparation of a Dispersion D1 of Polymer P1

The invert emulsion E1 of polymer P1 obtained in Example 1 was heated to 90° C. under a reduced pressure atmosphere (100 millibar) to evaporate the water and the lightest oil fractions. A dispersion D1 containing 55.5% by weight of polymer P1 was obtained. This dispersion contained less than 10% water.

Example 3 (Counter-Example)—Preparation of an Injection Fluid F1 of Polymer P1

An inverting agent, ethoxylated fatty alcohol (Lutensol TO89®), was added in a proportion of 10% by weight to the dispersion D1. An injection fluid F1 containing 50% by weight of polymer P1 was obtained.

Example 4—Preparation of an Injection Fluid F2 of Polymer P1

The dispersion D1 obtained in Example 2 was diluted by adding 18% of saturated aqueous sodium chloride solution and 10% inverting agent (Lutensol TO89®). An injection fluid F2 containing 40% by weight of polymer P1 was obtained.

Example 5—Preparation of an Injection Fluid F3 of Polymer P1

The dispersion D1 obtained in Example 2 was diluted by adding 18% by weight of saturated aqueous ammonium chloride solution and 10% inverting agent (Lutensol TO89®). An injection fluid F3 containing 40% by weight of polymer P1 was obtained.

Example 6—Preparation of an Injection Fluid F4 of Polymer P1

The dispersion D1 obtained in Example 2 was diluted by adding 18% by weight of saturated aqueous ammonium thiocyanate solution and 10% inverting agent (Lutensol TO89®). An injection fluid F4 containing 40% by weight of polymer P1 was obtained.

Example 7—Preparation of an Injection Fluid F5 of Polymer P1

The dispersion D1 obtained in Example 2 was diluted by adding 18% by weight of saturated aqueous ammonium sulfate solution and 10% inverting agent (Lutensol TO89®). An injection fluid F5 containing 40% by weight of polymer P1 was obtained.

Example 8—Preparation of an Injection Fluid F6 of Polymer P1

The dispersion D1 obtained in Example 2 was diluted by adding 18% by weight of saturated aqueous ammonium thiosulfate solution and 10% inverting agent (Lutensol TO89®). An injection fluid F6 containing 40% by weight of polymer P1 was obtained.

Inversion Tests

The injection fluids F1 (comparative) and F2 to F6 (of the invention) were placed in solution following two different protocols.

Protocol 1 (Direct Addition of the Injection Fluids to a Brine)

A synthetic seawater is prepared by dissolving 30 g NaCl and 3 g $CaCl_2$ in 1000 mL of water.

Under agitation (three-bladed agitator)—500 rpm—X g of dispersion is injected into Y mL of synthetic seawater at 20° C.

Where X equals 5 and Y equals 495 for dispersion F1.
Where X equals 6.25 and Y equals 493.75 for dispersions F2 to F6.

The mixture is left under agitation for 20 minutes, after which a solution is obtained containing 5 g/L of polymer P1.

The viscosity of this solution is measured using a Brookfield viscosimeter, LVT-type model, at 25° C. and at 30 rpm.

Protocol 2 (Addition of the Injection Fluids to Water Followed by Addition of Salts).

Under agitation—500 rpm—X g of dispersion is injected at 20° C. into Y mL of deionized water.

Where X equals 5 and Y equals 478.5 for dispersion F1.
Where X equals 6.25 and Y equals 477.25 for dispersions F2 to F6.

The mixture is left under agitation for 20 minutes, after which 15 g of NaCl and 1.5 g of $CaCl_2$ are added to the solution.

The mixture is left under agitation for 10 minutes, and a solution is obtained containing 5 g/L of polymer P1.

The viscosity of this solution is measured using a Brookfield viscosimeter, LVT-type model, at 25° C. and at 30 rpm.

Experimental Results

TABLE 1

Viscosity of solutions containing 5 g/L of polymer P1 in synthetic seawater

| Injection fluid | P1 concentration by weight (%) | Salt in brine (S) | Viscosity (cP) protocol 1 | Viscosity (cP) protocol 2 |
| --- | --- | --- | --- | --- |
| F1 | 50 | — | 89 | 235 |
| F2 | 40 | NaCl | 180 | 245 |
| F3 | 40 | $NH_4Cl$ | 160 | 240 |
| F4 | 40 | $NH_4SCN$ | 100 | 235 |
| F5 | 40 | $(NH_4)_2SO_4$ | 165 | 240 |
| F6 | 40 | $(NH_4)_2S_2O_3$ | 195 | 245 |

By following protocol 2, irrespective of the injection fluid, the viscosity obtained is 240 centipoises +/−5. Polymer P1 is rapidly released in deionized water. The subsequent addition of salts does not lead to any difference between the different viscosities. However, protocol 2 is not applied on site since the polymer is placed directly in solution in brines.

By following protocol 1, it is observed that the injection fluid F1 (counter-example) generates very little viscosity (89 cP).

By using injection fluids F2 to F6, the viscosity of the solutions of polymer P1 in seawater is higher. Polymer P1 in these injection fluids is released more easily into seawater. The method for preparing injection fluids according to the invention therefore allows improved release of the polymer in brine.

The invention claimed is:
1. An injection fluid for hydraulic fracturing comprising a synthetic water-soluble polymer with a weight average molecular weight greater than or equal to 1 million daltons, prepared according to a method comprising:

preparing, by radical polymerization, an inverse emulsion comprising between 15% and 40% by weight of the polymer, between 20% and 60% by weight of water and at least one hydrocarbon-based solvent, the percentages being expressed by weight relative to the weight of the emulsion;

distilling the emulsion to obtain a dispersion comprising between 40% and 60% by weight of particles of the polymer, less than 10% by weight of water and at least one hydrocarbon-based solvent, the percentages being expressed by weight relative to the weight of the dispersion; and diluting the dispersion with 1% to 15% by weight of an aqueous solution comprising between 20% and 60% of salts, the percentages being expressed by weight relative to the weight of the dispersion.

2. The injection fluid according to claim 1, wherein the polymer is obtained from the following non-ionic and/or anionic and/or cationic and/or zwitterionic water-soluble monoethylenically unsaturated monomers:
non-ionic monomers chosen from the group consisting of:
acrylamide,
methacrylamide, N-alkylacrylamides,
N-alkylmethacrylamides,
N,N-dialkyl acrylamides,
N,N-dialkylmethacrylamides,
alkoxylated esters of acrylic acid,
alkoxylated esters of methacrylic acid,
N-vinylpyridine,
N-vinylpyrrolidone,
hydroxyalkyl acrylates, and
hydroxyalkyl methacrylates;
anionic monomers chosen from the group consisting of:
monomers having a carboxylic function and the salts thereof including acrylic acid, methacrylic acid, itaconic acid, maleic acid;
monomers having a sulfonic acid function and the salts thereof including acrylamide tertiary butyl sulfonic acid (ATBS), allyl sulfonic acid and methallyl sulfonic acid and the salts thereof; and
monomers having a phosphonic acid function and the salts thereof;
cationic monomers chosen from the group consisting of:
dimethylaminoethyl acrylate (DMAEA) quaternized or salified;
dimethylaminoethyl methacrylate (DMAEMA) quaternized or salified;
diallyldimethylammonium chloride (DADMAC);
acrylamidopropyltrimethylammonium chloride (APTAC); and
methacrylamidopropyltrimethylammonium chloride (MAPTAC); and
zwitterionic monomers chosen from the group consisting of:
sulfobetaine monomers;
phosphobetaine monomers; and
carboxybetaine monomers.

3. The injection fluid according to claim 1, wherein the emulsion comprises from 0.5% to 5.0% by weight, the percentages being expressed by weight relative to the weight of the emulsion, of at least one emulsifying agent chosen from the group consisting of:
sorbitan esters,
polyethoxylated sorbitan esters,
polyethoxylated fatty acids,
polyethoxylated fatty alcohols,
polyesters having an average molecular weight of between 1000 and 3000 daltons resulting from condensation between a poly(isobutenyl) succinic acid or anhydride thereof and a polyethylene glycol,
block copolymers having an average molecular weight of between 2500 and 3500 daltons resulting from condensation between hydroxystearic acid and a polyethylene glycol,
ethoxylated fatty amines,
derivatives of di-alkanol amides,
copolymers of stearyl methacrylate, and
mixtures thereof.

4. The injection fluid according to claim 1, wherein the particles of the polymer in the dispersion have a mean size of between 0.01 µm and 100 µm.

5. The injection fluid according to claim 1, wherein the method further comprises adding to the dispersion, before said diluting, of between 0.2% and 10% by weight, the percentages being expressed by weight relative to the weight of the dispersion, of at least one inverting agent chosen from the group consisting of:
ethoxylated nonylphenols;
ethoxylated/propoxylated alcohols;
ethoxylated tridecyl alcohols;
polyethoxylated fatty acids;
poly(ethoxylated/propoxylated) fatty alcohols;
ethoxylated sorbitan esters;
polyethoxylated sorbitan laurate;
polyethoxylated castor oil;
heptaoxyethylated lauryl alcohol;
polyethoxylated sorbitan monostearate;
alkylphenol polyethoxylated cetyl ethers;
polyoxyethylene alkyl aryl ethers;
N-cetyl-N-ethyl morpholinium ethosulfate;
sodium lauryl sulfate;
condensation products of fatty alcohols with ethylene oxide;
condensation products of alkylphenols and ethylene oxide;
condensation products of fatty amines with 5 or more molar equivalents of ethylene oxide;
ethoxylated tristyryl phenols;
condensates of ethylene oxide with polyhydric alcohols partially esterified with fatty chains and anhydrous forms thereof;
amine oxides;
alkyl polyglucosides;
glucamide;
phosphate esters;
alkylbenzene sulfonic acids and the salts thereof;
water-soluble surfactant polymers; and
mixtures thereof.

6. The injection fluid according to claim 1, wherein at least one portion of the water in the solution is extracted from the distillate of the emulsion.

7. The injection fluid according to claim 1, wherein the salts in the solution are chosen from the group consisting of:
alkali or alkaline-earth salts,
ammonium salts,
organic salts, and
a mixture thereof.

8. The injection fluid according to claim 7, wherein the salts are chosen from the group consisting of:
sodium chloride,
ammonium sulfate,
ammonium thiosulfate,
ammonium chloride, choline chloride,
monosaccharides, and
a mixture thereof.

9. The injection fluid according to claim 1, wherein at least one propping agent is added before said preparing, and/or between said preparing and said distilling, and/or between said distilling and said diluting, and/or after said diluting of the preparation method thereof.

10. A method for the hydraulic fracturing of an unconventional underground reservoir of oil or gas, comprising preparing an injection fluid according to claim 1, placing in solution in salt water to form a fracturing fluid and injecting the fracturing fluid into an underground formation.

11. A friction reducing method in a hydraulic fracturing operation of an unconventional underground reservoir of oil or gas, comprising preparing a fluid according to one of claim 1, placing in solution in salt water to form a fracturing fluid and injecting the fracturing fluid into an underground formation.

12. A method for preparing an injection fluid comprising:
preparing, by radical polymerization, an inverse emulsion comprising between 15% and 40% by weight of a synthetic water-soluble polymer with a weight average molecular weight greater than or equal to 1 million daltons, between 20% and 60% by weight of water and at least one hydrocarbon-based solvent, the percentages being expressed by weight relative to the weight of the emulsion;
distilling the emulsion to obtain a dispersion comprising between 40% and 60% by weight of particles of the polymer, less than 10% by weight of water and at least one hydrocarbon-based solvent, the percentages being expressed by weight relative to the weight of the dispersion; and
diluting the dispersion with 1% to 15% by weight of an aqueous solution comprising between 20% and 60% by weight of salts, the percentages being expressed by weight relative to the weight of the dispersion.

\* \* \* \* \*